US012562796B2

(12) United States Patent
Wang

(10) Patent No.: US 12,562,796 B2
(45) Date of Patent: Feb. 24, 2026

(54) METHOD FOR CSI REPORTING AND RELATED DEVICES

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 318 days.

(21) Appl. No.: 18/260,698

(22) PCT Filed: Jan. 29, 2022

(86) PCT No.: PCT/CN2022/074885
§ 371 (c)(1),
(2) Date: Jul. 7, 2023

(87) PCT Pub. No.: WO2022/148490
PCT Pub. Date: Jul. 14, 2022

(65) Prior Publication Data
US 2024/0063868 A1 Feb. 22, 2024

(30) Foreign Application Priority Data
Jan. 8, 2021 (CN) .......................... 202110028635.2

(51) Int. Cl.
*H04B 7/06* (2006.01)

(52) U.S. Cl.
CPC ......... *H04B 7/0626* (2013.01); *H04B 7/0658* (2013.01)

(58) Field of Classification Search
CPC .... H04B 7/0626; H04B 7/0658; H04W 24/10
See application file for complete search history.

(56) References Cited

U.S. PATENT DOCUMENTS 7,746,802 B2 * 6/2010 Suh ........................ H04L 1/0073
370/332
2012/0063527 A1 * 3/2012 Hatakawa ......... H04L 25/03343
375/260
(Continued)

FOREIGN PATENT DOCUMENTS

CN 104081813 A 10/2014
CN 104811229 A 7/2015
(Continued)

OTHER PUBLICATIONS

WIPO, International Search Report and Written Opinion for International Application No. PCT/CN2022/074885, Apr. 20, 2022.

*Primary Examiner* — Ivan O Latorre
(74) *Attorney, Agent, or Firm* — HAUPTMAN HAM, LLP

(57) ABSTRACT
A method and apparatus for CSI reporting are disclosed in embodiments of the disclosure. The method includes the following. A terminal device receives network configuration information sent by a network device and obtain a CSI report based on the network configuration information, where the CSI report includes compressed channel information and/or an interference measurement result. Then the terminal device report the CSI report.

20 Claims, 6 Drawing Sheets

(56) References Cited

U.S. PATENT DOCUMENTS

| | | | | |
|---|---|---|---|---|
| 2012/0170641 A1* | 7/2012 | Hatakawa | | H04L 1/0029 |
| | | | | 375/240 |
| 2013/0201912 A1* | 8/2013 | Sheng | | H04B 7/0626 |
| | | | | 370/328 |
| 2013/0336214 A1* | 12/2013 | Sayana | | H04W 72/542 |
| | | | | 370/328 |
| 2014/0010126 A1* | 1/2014 | Sayana | | H04J 3/1694 |
| | | | | 370/336 |
| 2014/0313912 A1* | 10/2014 | Jongren | | H04B 17/26 |
| | | | | 370/252 |
| 2016/0365913 A1* | 12/2016 | Lau | | H04L 1/0029 |
| 2020/0169374 A1* | 5/2020 | Qi | | H04B 7/024 |
| 2020/0221444 A1* | 7/2020 | Tiirola | | H04W 72/21 |
| 2021/0184744 A1* | 6/2021 | Pezeshki | | H04L 5/0048 |
| 2021/0409991 A1* | 12/2021 | Park | | H04L 5/0048 |
| 2022/0006539 A1* | 1/2022 | Sun | | H04B 7/0691 |
| 2022/0014957 A1* | 1/2022 | Guo | | H04B 7/0626 |
| 2022/0060919 A1* | 2/2022 | Li | | H04B 7/0658 |
| 2022/0149904 A1* | 5/2022 | Timo | | H04L 1/0026 |
| 2022/0149908 A1* | 5/2022 | Gao | | H04B 7/0645 |
| 2022/0416861 A1* | 12/2022 | Manolakos | | H04L 1/0029 |
| 2023/0042538 A1* | 2/2023 | Sun | | H04L 5/0094 |
| 2023/0164817 A1* | 5/2023 | Bhamri | | H04W 72/51 |
| | | | | 370/329 |
| 2023/0189274 A1* | 6/2023 | Li | | H04L 1/1671 |
| | | | | 370/336 |
| 2024/0063868 A1* | 2/2024 | Wang | | H04B 7/0658 |
| 2024/0250730 A1* | 7/2024 | Wang | | H04B 17/336 |
| 2024/0356595 A1* | 10/2024 | Sun | | H04W 72/21 |
| 2024/0413877 A1* | 12/2024 | Qi | | H04B 7/06952 |
| 2025/0038816 A1* | 1/2025 | Beluri | | H03M 7/70 |
| 2025/0088889 A1* | 3/2025 | Li | | H04L 5/0057 |
| 2025/0202556 A1* | 6/2025 | Mu | | H04W 8/22 |

FOREIGN PATENT DOCUMENTS

| | | |
|---|---|---|
| CN | 108810932 A | 11/2018 |
| CN | 111277360 A | 6/2020 |
| CN | 111294850 A | 6/2020 |
| CN | 111836309 A | 10/2020 |

* cited by examiner

NETWORK
DEVICE

TERMINAL
DEVICE

TERMINAL
DEVICE

TERMINAL
DEVICE

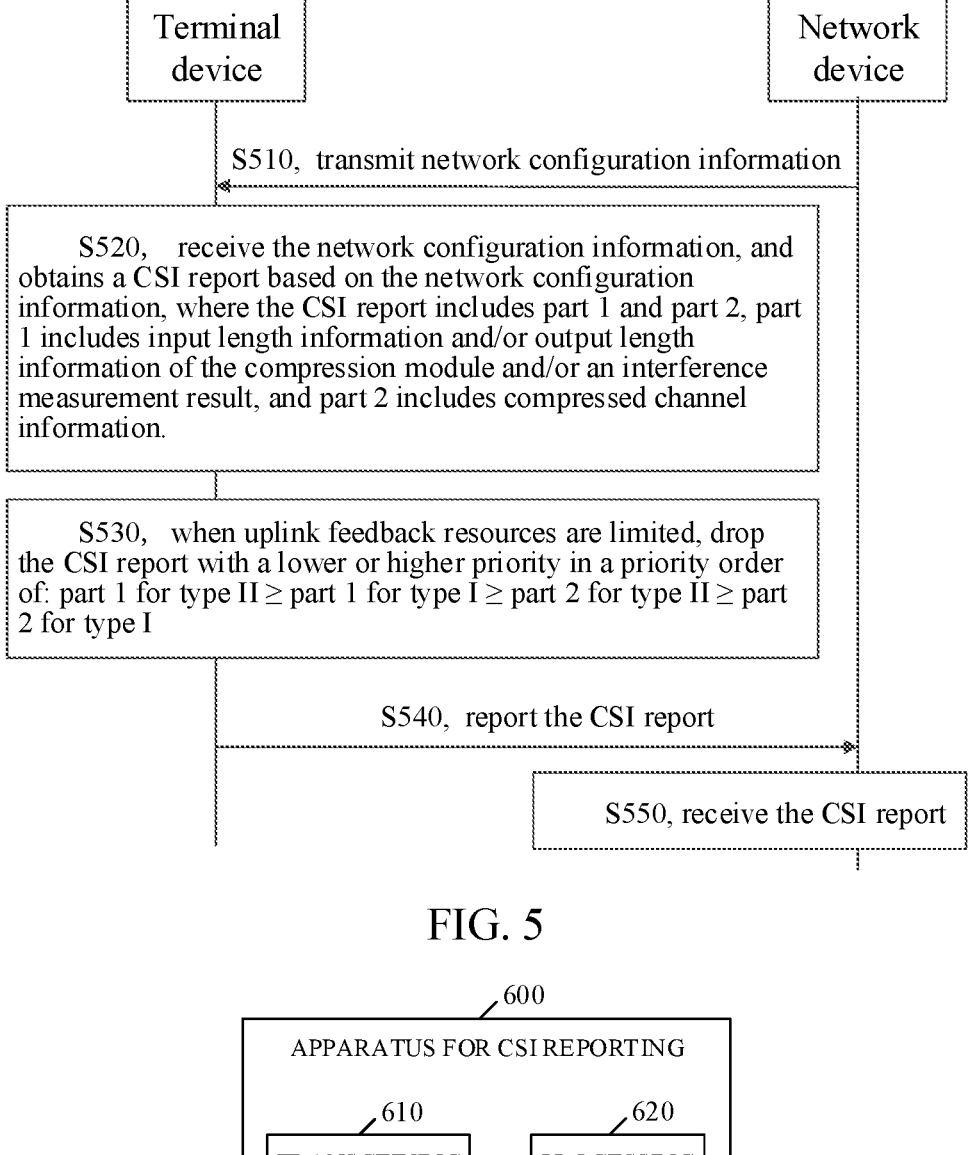

Terminal device

Network device

S510, transmit network configuration information

S520, receive the network configuration information, and obtains a CSI report based on the network configuration information, where the CSI report includes part 1 and part 2, part 1 includes input length information and/or output length information of the compression module and/or an interference measurement result, and part 2 includes compressed channel information.

S530, when uplink feedback resources are limited, drop the CSI report with a lower or higher priority in a priority order of: part 1 for type II ≥ part 1 for type I ≥ part 2 for type II ≥ part 2 for type I S540, report the CSI report S550, receive the CSI report

APPARATUS FOR CSI REPORTING

610

TRANSCEIVING UNIT

620

PROCESSING UNIT

FIG. 6

METHOD FOR CSI REPORTING AND RELATED DEVICES

CROSS-REFERENCE TO RELATED APPLICATION(S)

This application is a National Stage of International Application No. PCT/CN2022/074885, filed on Jan. 29, 2021, which claims priority to Chinese Application No. 2021100286352, filed on Jan. 8, 2021, both of which are incorporated by reference herein.

TECHNICAL FIELD

This application relates to the field of communication technology, and in particular to a method for CSI reporting and related devices.

BACKGROUND

In new radio (NR) R15/16/17, Type I and Type II codebooks are supported, as well as enhanced Type II and further enhanced Type II codebooks. The basic principle of Type I codebook feedback is that a user equipment (UE) matches codebooks specified by the protocol with an estimated channel, selects the codebook that best matches the channel, and then feedbacks an index corresponding to the codebook to the network side. For Type II codebook and enhancements thereof, the basic principle is to use high-resolution channel state information (CSI) feedback and performs certain processing on the estimated channel, so as to feedback the processed information, including a quantized amplitude and a quantized phase.

Currently, introduction of artificial intelligence technology at the CSI level, i.e., intelligent CSI feedback, is being widely discussed in the industry. However, there is no specific solution as to what information should be included in the CSI report after the introduction of the intelligent module.

SUMMARY

In a first aspect, embodiments of the present disclosure provide a method for CSI reporting. The method is applied to a terminal device and includes: receiving network configuration information sent by a network device; obtaining a CSI report based on the network configuration information, the CSI report including compressed channel information and/or an interference measurement result; and reporting the CSI report to the network device.

In a second aspect, an electronic device is provided. The electronic device includes a processor, a memory, a communication interface, and one or more programs, where the one or more programs are stored in the memory and configured to be executed by the processor to perform the method of the first aspect.

In a third aspect, a non-transitory computer-readable storage medium is provided, which stores a computer program for electronic data interchange, where the computer program causes a computer to perform the method of the first aspect.

BRIEF DESCRIPTION OF THE DRAWINGS

In order to illustrate more clearly the technical solutions in the embodiments of the present disclosure, the following is a brief description of the accompanying drawings to be used in the description of the embodiments. It is obvious that the accompanying drawings in the following description are some of the embodiments of the present disclosure and that other accompanying drawings may be obtained by a person of ordinary skill in the art on the basis of these drawings without any creative effort.

FIG. 5 is a schematic flowchart of another method for CSI reporting provided in embodiments of the present disclosure.

FIG. 6 is a schematic structural diagram of an apparatus for CSI reporting according to an embodiment of the present disclosure.

DETAILED DESCRIPTION

Figure 1:
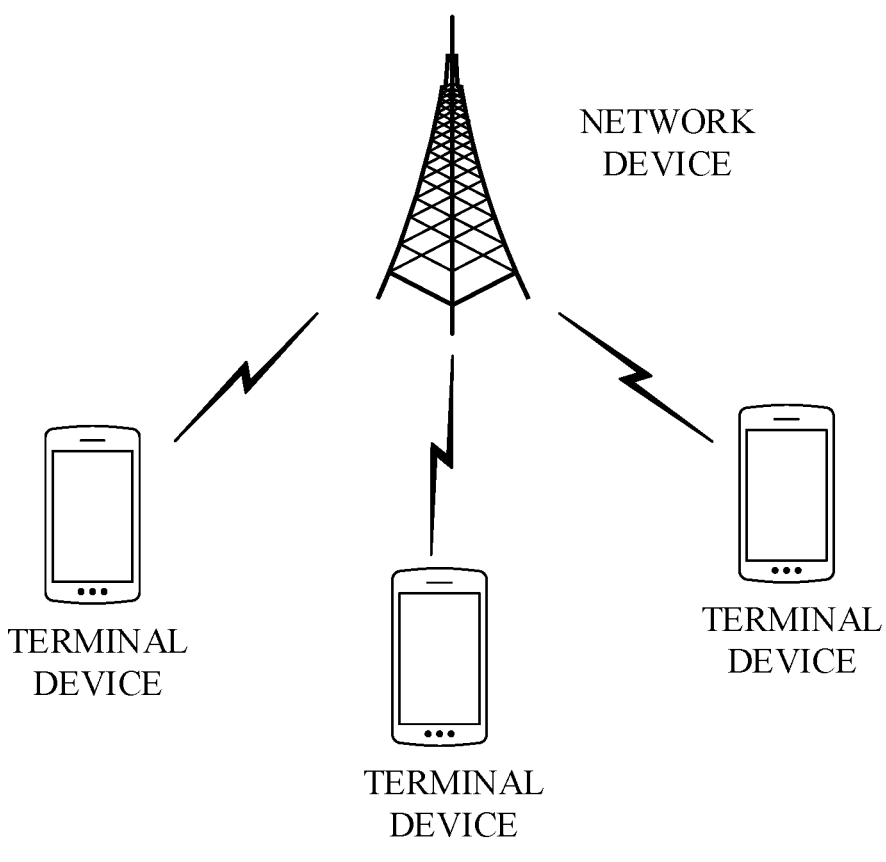
FIG. 1 is a schematic architectural diagram of a communication system provided in embodiments of the present disclosure.

Embodiments of the disclosure are described below in conjunction with the accompanying drawings in the embodiments of the disclosure.

It should be understood that the technical solution in the embodiments of the present disclosure may be applied to a global system for mobile communications (CSM), a code division multiple access (CDMA) system, a wideband code division multiple access (WCDMA) system, a worldwide interoperability for microwave access (Wi-MAX) system, a long term evolution (LTE) system, a 5G communication system (such as new radio (NR)), a communication system combining multiple communication technologies (for example, a communication system combining the LTE technology and the NR technology), or a future communication system, such as a 6G communication system and a 7G communication system, which is not limited in the embodiments of the present disclosure. The technical solutions of the embodiments of the present disclosure are also applicable to different network architectures, including but not limited to a relay network architecture, a dual-link architecture, and a vehicle-to-everything architecture.

The embodiments of the present disclosure relate to a terminal device. The terminal device includes a device having wireless communication functions. The terminal device may be a mobile phone, a tablet computer, a computer with a wireless transceiving function, a virtual reality (VR) terminal device, an augmented reality (AR) terminal device, a wireless terminal in industrial control, a wireless terminal in self-driving, a wireless terminal in remote medical system, a wireless terminal in smart grid, a wireless terminal in smart home, and the like. The terminal device may also be a handheld device, a vehicle-mounted device, a wearable device, or a computer device having a wireless communication function, or another processing device connected to a wireless modem, a terminal device in a future 5G network, or a terminal device in a future evolved public land mobile network (PLMN). The terminal devices in different networks may be called as different names, for example, a user equipment, an access terminal, a user unit, a user station, a mobile station (MS), a remote station, a remote terminal, a mobile device, a user terminal, a terminal, a wireless communication device, a user agent or user device, a cellular telephone, a cordless telephone, a session initiation protocol (SIP) phone, a wireless local loop (WLL) station, a personal digital assistant (PDA), a terminal device in a 5G network or a future evolution network, etc. The embodiments of the present disclosure are not limited thereto.

The embodiments of the present disclosure relate to a network device. The network device may be a device for communicating with a terminal device. The network device includes a radio access network (RAN) device, a base station controller of the RAN, and a device at a core network side. For example, the network device may be a base station of the RAN at the access network side in a cellular network, including but not limited to: an evolved Node B (eNB), a radio network controller (RNC), a Node B (NB), a base station controller (BSC), a base transceiver station (BTS), a home base station (such as a home evolved Node B or a home Node B (HNB)), a baseband unit (BBU), and a mobility management entity (MME). For another example, the network device may also be a node device in a wireless local area network (WLAN), such as an access controller (AC), a gateway, or a WIFI access point (AP). For another example, the network device may also be an access network device (such as a gNB, a CU, and a DU) and a continuously-evolved node B (ng-eNB) in an NR system, where the gNB and the terminal device communicate by using an NR technology, the ng-eNB and the terminal device communicate by using an evolved universal terrestrial radio access (E-UTRA) technology, and both the gNB and the ng-eNB may be connected to a 5G core network. The network device in the embodiments of the present disclosure further includes a device that provides a base station function in a future new communication system.

Referring to FIG. 1, FIG. 1 is a schematic architectural diagram of a communication system according to an embodiment of the present disclosure. As shown in FIG. 1, the communication system includes a network device and a terminal device. Here, b=3 is taken as an example for description. The network device may provide a wireless access service for the terminal device. Each network device corresponds to a service coverage area, and a terminal device entering the area can communicate with the network device via wireless signals. In addition, the network devices may communicate with each other.

Based on the system architecture shown in FIG. 1, after performing CSI measurement, the terminal device may report CSI. The CSI reporting can be realized by transmitting a CSI report to the network device, and the CSI report may include a CSI measurement result of the terminal device. The network device performs scheduling adjustment and/or beam management related work according to the reported contents.

It is now extensively explored in the industry to introduce artificial intelligence (AI) technology at the CSI level, i.e., to support intelligent CSI feedback. Specifically, the terminal side performs channel estimation based on a channel state information-reference signal (CSI-RS) to obtain downlink channel information, an intelligent module is introduced at the terminal side to compress the downlink channel information, and then the compressed channel information is fed back to the network side. The network side recovers the compressed channel information using the intelligent module. In this way, the feedback overhead of the terminal can be reduced effectively, and at the same time, the network side can obtain channel information with high accuracy compared with the existing CSI feedback mechanism. However, there is no specific solution at present of what information should be contained in the CSI report after the introduction of the intelligent module.

In order to solve the described problem, the embodiments of the present disclosure provide a method for CSI reporting. A terminal device obtains a CSI report based on network configuration information, where the CSI report includes compressed channel information and/or an interference measurement result, and then the terminal device reports the CSI report. In this way, in the scenario where intelligent CSI feedback is supported, the terminal device can report to the network device the compressed channel information and/or the interference measurement result that are obtained according to network configuration information. As such, the technical solution of CSI reporting in the scenario in which intelligent CSI feedback is supported is implemented.

In order to enable a person skilled in the art to better understand the solutions of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall belong to the scope of protection of the present disclosure.

Figure 2:
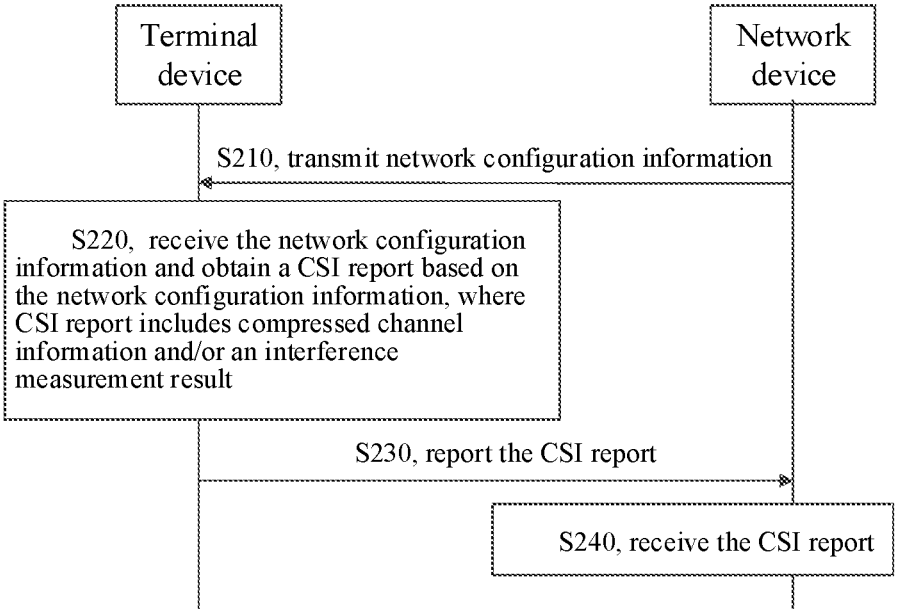
FIG. 2 is a schematic flowchart of a method for CSI reporting provided in embodiments of the present disclosure.

Referring to FIG. 2, FIG. 2 shows a method for CSI reporting. The method may be performed in the communication system as shown in FIG. 1. The method includes the following.

In S210, a network device transmits network configuration information to a terminal device.

The network device may transmit the network configuration information to the terminal device before the terminal device performs CSI measurement and CSI reporting. The terminal map perform the CSI measurement and CSI reporting according to the network configuration information.

Optionally, the network configuration information is CSI report configuration information, where the CSI report configuration information includes explicit or implicit indication information, and the indication information is used for indicating a type of a CSI measurement result expected to be included in an associated CSI report.

The network configuration information may be CSI report configuration (csi-reportConfig) information configured by a higher layer of radio resource control (RRC). The CSI report configuration information contains relevant configuration parameters for CSI reporting. For example, the CSI report configuration information includes indication information according to which the terminal device can know the type of CSI measurement result in this reported CSI report.

Optionally, the type of CSI measurement result includes type I and type II, where the type I is a type that has been supported by an existing standard, i.e., a type without channel information compression, and the type II is a type supporting channel information compression.

In embodiments of the present disclosure, in the scenario where the intelligent CSI feedback is supported, i.e., where the CSI measurement result is in the type supporting channel information compression, the CSI report may not include related reporting information such as a rank indicator (RI), a layer indicator (LI), a precoding matrix indicator (PMI), a CSI-reference signal resource indicator (CRI), or a channel quality indicator (CQI). The CSI report may directly include the compressed channel information.

The explicit indication information may be indicated by one bit or other numbers of bits. For example, for the two types of CSI measurement results mentioned above, the indication information may have the value 0 for the type I of the CSI measurement result, and the indication information may have the value 1 for the type II of the CSI measurement result. For another example, the indication information may have the value 1 for the type I of the CSI measurement result, and the indication information may have the value 0 for the type II of the CSI measurement result.

The implicit indication information may be a report quantity (reportQuantity). The terminal device is implicitly informed of the type of the CSI measurement result according to the specific content of the reportQuantity. For example, for the two types of CSI measurement results mentioned above, the indication information may have the value 0 for the type I of the CSI measurement result, and the indication information may have the value 1 for the type II of the CSI measurement result. For another example, the indication information may have the value 1 for the type I of the CSI measurement result, and the indication information may have the value 0 for the type II of the CSI measurement result.

In a possible embodiment, the CSI report configuration information further includes quantity information of receiving antennas of the terminal device.

The network device configures the quantity information of receiving antennas of the terminal device, and the terminal device can obtain input length information and/or output length information of a compression module based on the quantity information of receiving antennas.

In a possible embodiment, the CSI report configuration information further includes the input length information and/or the output length information of the compression module.

The input length information and/or output length information of the compression module are determined according to capability information reported by the terminal device.

Specifically, after powering on, the terminal device may report its capability information to the network device. Based on the capability information reported by the terminal device, the network device configures to the terminal device the input length information and/or output length information of the compression module that the terminal device can support, such that the input length information and/or output length information of the compression module configured by the network device can match the capabilities of the terminal device.

In S220, the terminal device receives the network configuration information from the network device and obtains a CSI report based on the network configuration information, where CSI report includes compressed channel information and/or an interference measurement result.

In embodiments of the disclosure, the terminal device performs channel estimation according to the network configuration information to obtain downlink channel information, then compresses the downlink channel information through the compression module to obtain the compressed channel information, and then generates the CSI report carrying the compressed channel information and the interference measurement result obtained from the measurement.

Optionally, the CSI report is divided into part 1 and part 2. The CSI report includes the compressed channel information and/or the interference measurement result obtained by the terminal device under the intelligent CSI feedback scenario, such that the terminal device is able to report the CSI report including the compressed channel information and/or interference measurement result. As such, the technical solution of CSI supporting under the intelligent CSI feedback scenario can be achieved.

In a possible embodiment, the part 1 includes the compressed channel information, and the part 2 includes group 0 and/or group 1, where the group 0 includes an interference measurement result based on channel state information-interference measurement (CSI-IM), and the group 1 includes an interference measurement result based on a non-zero power (NZP) channel state information-reference signal (CSI-RS).

In the scenario where intelligent CSI feedback is supported, the CSI report obtained by the terminal device according to the network configuration information may consist of two parts. Part 1 includes the compressed channel information, e.g., Channel, and part 2 includes the interference measurement result.

Resource information associated with the CSI report configuration information includes resources for interference measurement: NZP-CSI-RS and/or CSI-IM. When the terminal device is configured with the CSI-IM, part 2 of the CSI report may include the CSI-IM based measurement result. When the terminal device is configured with the NZP-CSI-RS, part 2 of the CSI report may include the NZP-CSI-RS based measurement result. When the terminal device is configured with the CSI-IM and the NZP-CSI-RS, part 2 of the CSI report may include the CSI-IM based measurement result and the NZP-CSI-RS based measurement result.

Optionally, the part 1 further includes the input length information and/or the output length information of the compression module.

The part 1 may further include the input length information and/or output length information of the compression module of the terminal device. The input length information and/or output length information of the compression module may be the input length information and/or output length information of the compression module in the CSI report configuration information configured by the network device. Specifically, the terminal device reports the capability information to the network device before receiving the network configuration information transmitted by the network device, and the network device configures the input length information and/or output length information of the compression module that can be supported by the terminal device based on the capability information reported by the terminal device.

Optionally, the method further includes that, based on the quantity information of receiving antennas, the terminal device determines the input length information and/or output length information of the compression module.

Specifically, the network device configures the quantity information of receiving antennas of the terminal device in the CSI report configuration information, and based on this quantity information of receiving antennas, the terminal device determines the input length information and/or output length information of the compression module and reports to the network device via the CSI report.

In a possible embodiment, the part 1 includes the input length information and/or output length information of the compression module, and the part 2 includes the compressed channel information and/or the interference measurement result.

In embodiments of the disclosure, the part 1 in the CSI report has a fixed load. The part 1 includes the input length information and/or output length information of the compression module, and the part 2 includes the compressed channel information and/or the interference measurement result. The interference measurement result includes the CSI-IM based interference measurement result and/or the NZP CSI-RS based interference measurement result.

In a possible embodiment, the part 1 includes the input length information and/or output length information of the compression module, and/or the interference measurement result. The part 2 includes the compressed channel information.

In a possible embodiment, the part 1 includes the compressed channel information. The part 2 includes the input length information and/or output length information of the compression module, and/or the interference measurement result.

In a possible embodiment, the part 1 includes the compressed channel information and/or the interference measurement result. The part 2 includes the input length information and/or output length information of the compression module.

In a possible embodiment, the part 1 includes group 0 and/or group 1, where the group 0 includes the CSI-IM based interference measurement result, and the group 1 includes NZP CSI-RS based interference measurement result. The part 2 includes the compressed channel information.

The part 2 further includes the input length information and/or output length information of the compression module.

In a possible embodiment, the method further includes: prior to reporting the CSI report to the network device, if uplink feedback resources are limited, dropping preferentially some or all of the part 2 with a lower or higher priority in a first priority order, where the first priority order is: group 0>group 1.

In a specific embodiment, when uplink feedback resources are limited, the terminal device may choose to partially or fully drop the part 2 of the CSI report in order to reduce the feedback overhead of the terminal device. The terminal device may also choose to partially or fully drop the part 2 of the CSI report under other conditions, for example, after receiving a drop command from the network device.

For example, when dropping some or all of the part 2 of the CSI report, the lower priority part 2 may be dropped first or the higher priority part 2 may be dropped first. For example, when the part 2 includes group 0 and group 1, group 1 may be dropped first or group 0 may be dropped first. When the part 2 does not include the interference measurement result, all of the part 2 may be dropped.

It should be noted that the above priorities may be used for dropping groups in part 2. In practice, the above priorities may also be used in other scenarios, such as determining a measurement order based on priority, etc.

In a possible embodiment, the method further includes: prior to reporting the CSI report to the network device, if uplink feedback resources are limited, dropping preferentially some or all of the CSI report with a lower or higher priority in a second priority order, where the second priority order is: part 1 for type II≥part 1 for type I≥part 2 for type II≥part 2 for type I.

In specific embodiments, when uplink feedback resources are limited, the terminal device may choose to drop the CSI report in order to reduce the feedback overhead of the terminal device. The terminal device may also choose to drop the CSI report under other conditions, for example, after receiving a drop command from the network device.

When dropping the CSI report, part 2 or part 1 of the CSI report may be dropped first. For example, when the terminal device needs to report CSI report A and CSI report B with the same type of CSI measurement results, the terminal device may choose to drop part 1 of CSI report A and part 1 of CSI report B before dropping part 2 of CSI report A and part 2 of CSI report B. Optionally, the terminal device may choose to drop part 2 of CSI report A and part 2 of CSI report B before dropping part 1 of CSI report A and part 1 of CSI report B.

Further, when the CSI measurement results are of different types, the terminal device may preferentially drop the CSI measurement result with a lower priority or preferentially drop the CSI measurement result with a higher priority. The priority order is: CSI report with a CSI measurement result of type I>=CSI report with a CSI measurement result of type II. Specifically, the priority of CSI reports $Pri_{iCSI}(y, k,c,s)$ may be:

$$Pri_{iCSI}(y,k,c,s)=2*N_{cells}*M_s*y+N_{cells}*M_s*k+M_s*c+s$$

where y=0 for aperiodic CSI reports to be carried on PUSCH, y=1 for semi-persistent CSI reports to be carried on PUSCH, y=2 for semi-persistent CSI reports to be carried on PUCCH, and y=3 for periodic CSI reports to be carried on PUCCH. c is the cell index and $N_{cells}$ is the value of the higher layer parameter maxNrofServingCells. s is the CSI report configuration ID reportConfigID and Ms is the value of the higher layer parameter maxNrofCSI-ReportConfigurations (number of CSI report configurations). k represents a type of the measurement parameter of the terminal device, and k=0 for CSI reports carrying L1-RSRP or L1-SINR and k=1 for CSI reports not carrying L1-RSRP or L1-SINR. If the value of $Pri_{iCSI}(y,k,c,s)$ associated with CSI report A is less than the value of $Pri_{iCSI}(y,k,c,s)$ associated with CSI report B, then CSI report A has priority over CSI Report B.

Exemplarily, when the terminal device needs to report a CSI report with the CSI measurement result of type II and a CSI report with the CSI measurement result of type I, the terminal device may choose to first drop part 2 of the CSI report with the CSI measurement result of type I. If the uplink feedback resources are still insufficient, the terminal device may then drop part 2 of the CSI report with the CSI measurement result of type II. If the uplink feedback resources are still insufficient, the terminal device may then drop part 1 of the CSI report with the CSI measurement result of type I. If the uplink feedback resources are still insufficient, the terminal device may then drop part 1 of the CSI report with the CSI measurement result of type II.

Exemplarily, when the terminal device needs to report a CSI report with the CSI measurement result of type II and a CSI report with the CSI measurement result of type I, the terminal device may choose to first drop part 1 of the CSI report with the CSI measurement result of type II. If the uplink feedback resources are still insufficient, the terminal device may then drop part 1 of the CSI report with the CSI measurement result of type I. If the uplink feedback resources are still insufficient, the terminal device may then drop part 2 of the CSI report with the CSI measurement result of type II. If the uplink feedback resources are still insufficient, the terminal device may then drop part 2 of the CSI report with the CSI measurement result of type I.

It should be noted that the above priorities may be used for dropping groups in the CSI report. Further, the above priorities may also be used in other scenarios, such as determining the measurement order based on priority, etc.

In S230, the terminal device reports a CSI report to the network device.

Specifically, the terminal device obtains the CSI report and then reports the CSI report to the network device.

In S240, the network device receives the CSI report from the terminal device.

Accordingly, the network device receives the CSI report from the terminal device and then uses the compression model to recover the compressed channel information. In this way, the feedback overhead of the terminal can be effectively reduced, while the network device can obtain highly accurate channel information compared with existing CSI feedback mechanisms.

It can be seen that according to the method for CSI reporting provided in the embodiments of the disclosure, the terminal device receives the network configuration information from the network device, and obtain the CSI report based on the network configuration information, where the CSI report includes the compressed channel information and/or the interference measurement result. Then the terminal device report the CSI report. In this way, under a scenario in which intelligent CSI feedback is supported, the terminal device can report to the network device the compressed channel information and the interference measurement result obtained according to the network configuration information, such that the technical solution of CSI reporting under the intelligent CSI feedback scenario is achieved.

Figure 3:
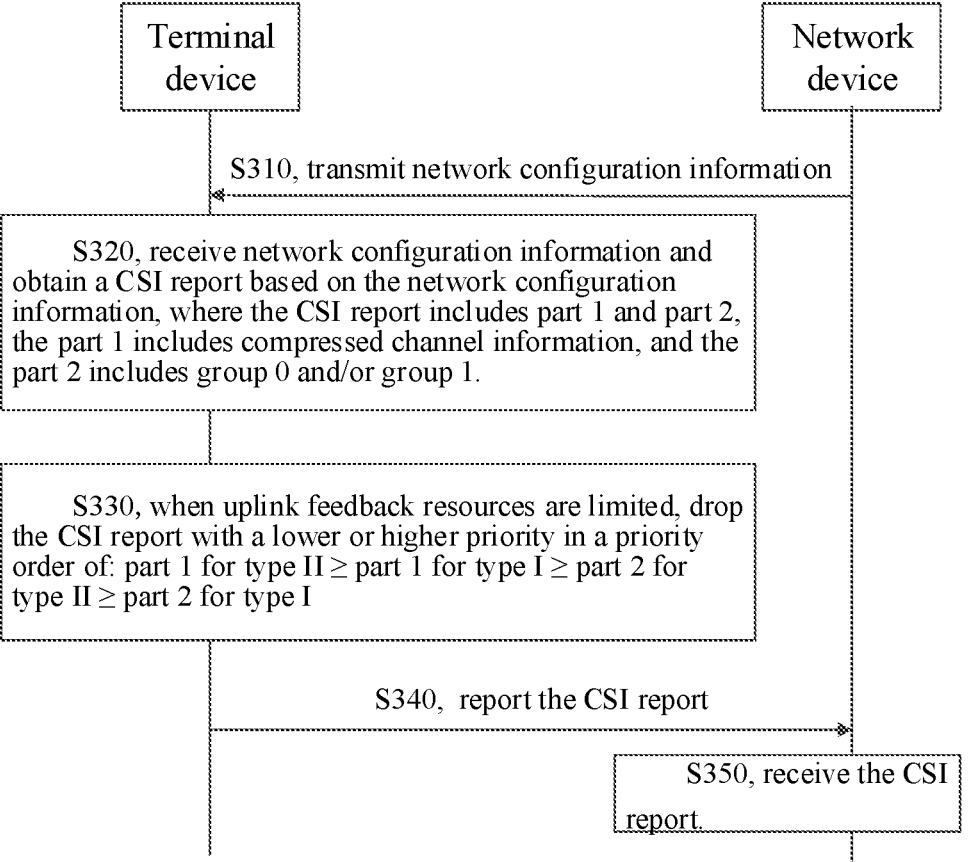
FIG. 3 is a schematic flowchart of another method for CSI reporting provided in embodiments of the present disclosure.

Referring to FIG. 3, FIG. 3 shows a method for CSI reporting in embodiments of the disclosure, which may be performed under a network architecture as shown in FIG. 1. The method includes the following operations.

In S310, the network device transmits network configuration information to the terminal device.

In S320, the terminal device receives network configuration information sent by the network device, and obtains a CSI report based on the network configuration information, where the CSI report includes part 1 and part 2, the part 1 includes compressed channel information, and the part 2 includes group 0 and/or group 1.

In S330, when uplink feedback resources are limited, the terminal device drops the CSI report with a lower or higher priority in a priority order of: part 1 for type II≥part 1 for type I≥part 2 for type II≥part 2 for type I.

In S340, the terminal device reports the CSI report to the network device.

In S350, the network devices receives the CSI report.

The group 0 includes a CSI-IM based interference measurement result, and the group 1 includes a NZP CSI-RS based interference measurement result. The part 1 may further include input length information and/or output length information of a compression module.

Reference for description for the above operations S310-S350 may be made to the corresponding operations described in FIG. 2 above and will not be repeated here.

The technical solution provided in the embodiments of this disclosure achieves a technical solution of CSI reporting under the scenario where the intelligent CSI feedback is supported, where the CSI report includes the compressed channel information and/or the interference measurement result, which can effectively reduce the feedback overhead of the terminal. Further, the CSI report can be dropped according to the priority order when uplink resources are limited, improving network quality.

Figure 4:
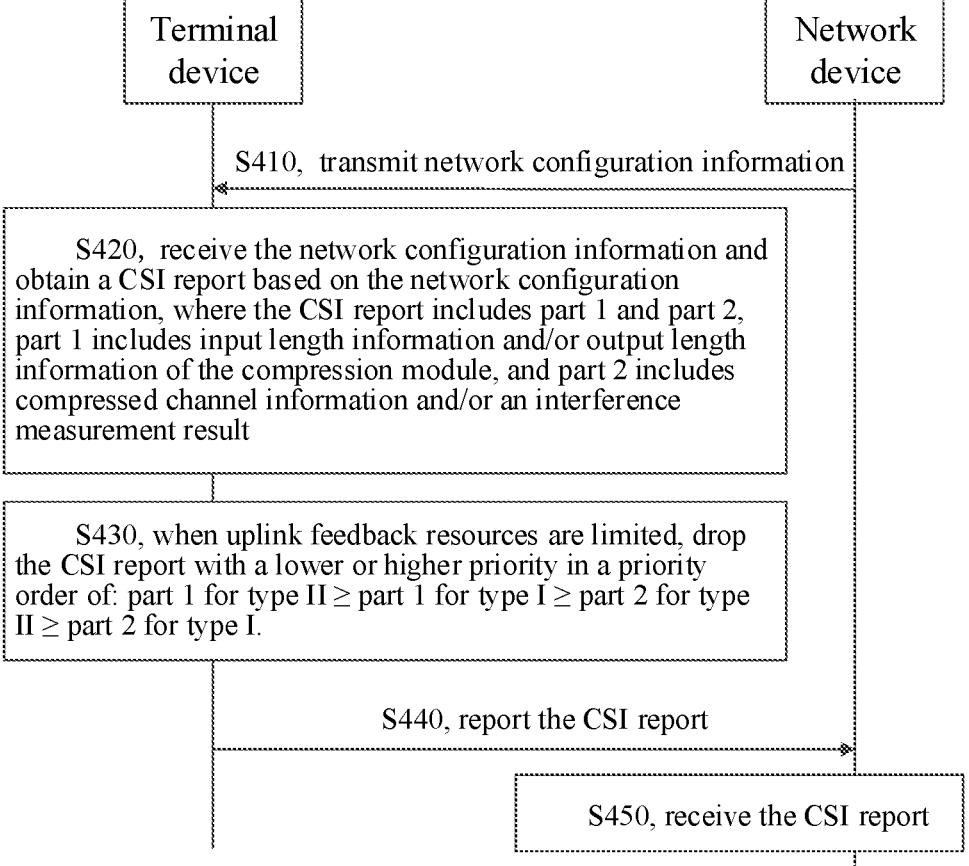
FIG. 4 is a schematic flowchart of another method for CSI reporting provided in embodiments of the present disclosure.

Referring to FIG. 4, FIG. 4 shows a method for CSI reporting according to embodiments of the disclosure, which can be performed under a network architecture as shown in FIG. 1. The method includes the following operations.

In S410, the network device transmits network configuration information to the terminal device.

In S420, the terminal device receives the network configuration information sent by the network device, and obtains a CSI report based on the network configuration information, where the CSI report includes part 1 and part 2, part 1 includes input length information and/or output length information of the compression module, and part 2 includes compressed channel information and/or an interference measurement result.

In S430, when uplink feedback resources are limited, the terminal device drops the CSI report with a lower or higher priority in a priority order of: part 1 for type II≥part 1 for type I≥part 2 for type II≥part 2 for type I.

In S440, the terminal device reports the CSI report to the network device.

In S450, the network devices receives the CSI report.

Reference for description for the above operations S410-S450 may be made to the corresponding operations described in FIG. 2 above and will not be repeated here.

The technical solution provided in the embodiments of this disclosure achieves a technical solution of CSI reporting under the scenario where the intelligent CSI feedback is supported, where the CSI report includes the compressed channel information and/or the interference measurement result, which can effectively reduce the feedback overhead of the terminal. Further, the CSI report can be dropped according to the priority order when uplink resources are limited, improving network quality.

Referring to FIG. 5, FIG. 5 shows a method for CSI reporting according to embodiments of the disclosure, which can be performed under a network architecture as shown in FIG. 1. The method includes the following operations.

In S510, the network device transmits network configuration information to the terminal device.

In S520, the terminal device receives the network configuration information sent by the network device, and obtains a CSI report based on the network configuration information, where the CSI report includes part 1 and part 2, part 1 includes input length information and/or output length information of the compression module and/or an interference measurement result, and part 2 includes compressed channel information.

In S530, when uplink feedback resources are limited, the terminal device drops the CSI report with a lower or higher priority in a priority order of: part 1 for type II≥part 1 for type I≥part 2 for type II≥part 2 for type I.

In S540, the terminal device reports the CSI report to the network device.

In S550, the network devices receives the CSI report.

Reference for description for the above operations S510-S550 may be made to the corresponding operations described in FIG. 2 above and will not be repeated here.

The technical solution provided in the embodiments of this disclosure achieves a technical solution of CSI reporting under the scenario where the intelligent CSI feedback is supported, where the CSI report includes the compressed channel information and/or the interference measurement result, which can effectively reduce the feedback overhead of the terminal. Further, the CSI report can be dropped according to the priority order when uplink resources are limited, improving network quality.

The above describes the solution in the embodiments of the disclosure mainly from the point of view of the execution process on the method side. It will be understood that the electronic device, in order to implement the above-mentioned functions, contains hardware structures and/or software modules that perform the respective functions. A person skilled in the art should easily realize that, in combination with the units and algorithmic steps of the various examples described in the embodiments provided herein, the present disclosure can be implemented in the form of hardware or a combination of hardware and computer software. Whether a particular function is performed as hardware or computer software driving hardware depends on the particular application and design constraints of the technical solution. The skilled person may use different methods to implement the described functionality for each particular application, but such embodiments should not be considered outside the scope of the present disclosure.

Referring to FIG. 6, FIG. 6 is a block diagram of functional units of an apparatus 600 for CSI reporting according to embodiments of the present disclosure. The apparatus 600 may be a terminal device, and may also be a network device. The device 600 includes a transceiver unit 610 and a processing unit 620.

In a possible embodiment, the apparatus 600 is configured to perform respective processes and operations corresponding to the terminal device in the above-mentioned method for CSI reporting.

The transceiver unit 610 is configured to receive network configuration information sent by a network device.

The processing unit 620 is configured to obtain a CSI report based on the network configuration information, where the CSI report includes compressed channel information and/or an interference measurement result.

The transceiver unit 610 is further configured to report the CSI report to the network device.

Optionally, the CSI report includes part 1 and part 2.

Optionally, the part 1 includes the compressed channel information. The part 2 includes group 0 and/or group 1, where the group 0 includes a CSI-IM-based interference measurement result, the group 1 includes a NZP CSI-RS-based interference measurement result.

Optionally, the part 1 further includes input length information and/or output length information of a compression module.

Optionally, the part 1 includes input length information and/or output length information of a compression module; and the part 2 includes the compressed channel information and/or the interference measurement result.

Optionally, the part 1 includes input length information and/or output length information of a compression module, and/or the interference measurement result; and the part 2 includes the compressed channel information.

The processing unit 620 is further configured to: prior to reporting the CSI report to the network device, drop preferentially some or all of the part 2 with a lower or higher priority in a first priority order if uplink feedback resources are limited.

Optionally, the first priority order is: group 0>group 1.

Optionally, the network configuration information is CSI report configuration information, the CSI report configuration information includes explicit or implicit indication information, and the indication information is used for indicating a type of a CSI measurement result expected to be contained in an associated CSI report.

Optionally, the type of the CSI measurement result includes type I and type II, where the type I is a type that has been supported by an existing standard, and the type II is a type supporting channel information compression.

Optionally, the CSI report configuration information further includes quantity information of receiving antennas of the terminal device.

Optionally, the processing unit 620 is further configured to determine input length information and/or output length information of a compression module according to the quantity information of receiving antennas.

Optionally, the CSI report configuration information further includes input length information and/or output length information of a compression module.

Optionally, the input length information and/or the output length information of the compression module are determined according to capability information reported by the terminal device.

Optionally, the processing unit 620 is further configured to: prior to reporting the CSI report to the network device, drop preferentially some or all of the CSI report with a lower or higher priority in a second priority order if uplink feedback resources are limited, where the second priority order is: part 1 for type II≥part 1 for type I≥part 2 for type II≥part 2 for type I.

In another possible embodiment, the apparatus 600 is configured to perform the respective processes and operations corresponding to the network device in the above-mentioned method for CSI reporting.

The transceiver unit 610 is configured to transmit network configuration information to a terminal device The transceiver unit 610 is further configured to receiving a CSI report from the terminal device, the CSI report including compressed channel information and/or an interference measurement result.

Optionally, the CSI report consists of part 1 and part 2.

Optionally, the part 1 includes the compressed channel information; and the part 2 includes group 0 and/or group 1, the group 0 including a CSI-IM-based interference measurement result, the group 1 including a NZP CSI-RS-based interference measurement result.

Optionally, the part 1 further includes input length information and/or output length information of a compression module.

Optionally, the part 1 includes input length information and/or output length information of a compression module; and the part 2 includes the compressed channel information and/or the interference measurement result.

Optionally, the part 1 includes input length information and/or output length information of a compression module, and/or the interference measurement result, and the part 2 includes the compressed channel information.

Optionally, the network configuration information is CSI report configuration information, the CSI report configuration information includes explicit or implicit indication information, and the indication information is used for indicating a type of a CSI measurement result expected to be contained in an associated CSI report.

Optionally, the type of the CSI measurement result includes type I and type II, where the type I is a type that has been supported by an existing standard, and the type II is a type supporting channel information compression.

Optionally, the CSI report configuration information further includes quantity information of receiving antennas of the terminal device, the quantity information of receiving antennas is used for the terminal device to determine input length information and/or output length information of the compression module.

Optionally, the CSI report configuration information further includes input length information and/or output length information of a compression module.

Optionally, the processing unit 620 is configured to determine the input length information and/or the output length information of the compression module according to capability information reported by the terminal device.

It will be understood that the functions of the various program modules of the apparatus for CSI reporting in the embodiments of the present disclosure may be specifically implemented according to the method embodiments described above, the specific implementation process of which can be referred to in the relevant description of the method embodiments described above and will not be repeated here.

It should be understood that the apparatus 600 herein is embodied in the form of a functional unit. The term "unit" herein may refer to an application specific integrated circuit (ASIC), an electronic circuit, a processor for executing one or more software or firmware programs (e.g., a shared processor, a proprietary processor or a group processors, etc.) and memory, combined logic circuits and/or other suitable components to support the described functions. In an optional example, it will be understood by those skilled in the art that the apparatus 600 may be specifically the terminal device and the network device in the embodiments described above, and that the apparatus 600 may be used to perform the various processes and/or operations corresponding to the terminal device and the network device in the method embodiments described above, which will not be repeated herein to avoid repetition.

The apparatus 600 in each of the above-mentioned embodiments has the function of implementing the corresponding operations performed by the terminal device and the network device in the above-mentioned method. The function may be implemented by hardware or by hardware executing the corresponding software. The hardware or software includes one or more modules corresponding to the functions. For example, the processing unit 620 may be replaced by a processor and the transceiving unit 610 may be replaced by a transmitter and a receiver, respectively performing the transceiver operation and the related processing operations in the respective method embodiment.

In the embodiment of the present disclosure, the apparatus 600 in FIG. 6 may also be a chip or a system on chip, e.g. a system on chip (SoC). Correspondingly, the transceiver unit may be the transceiver circuit of the chip and is not limited here.

Figure 7:
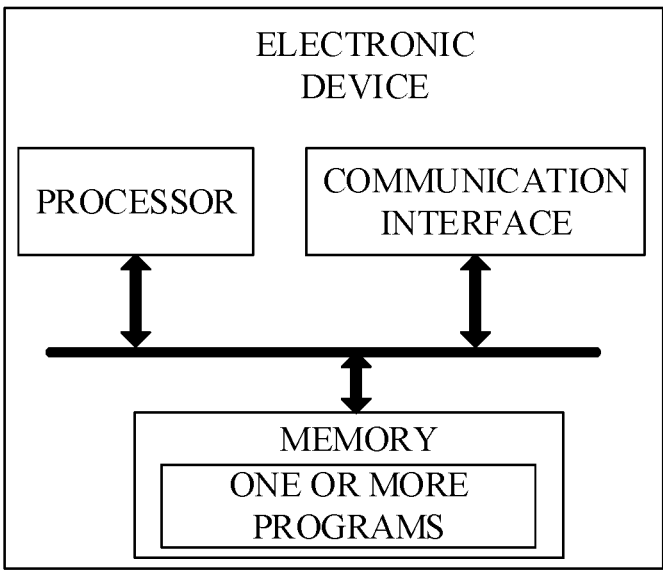
FIG. 7 is a schematic structural diagram of an electronic device provided in embodiments of the present disclosure.

Referring to FIG. 7, FIG. 7 shows an electronic device provided in an embodiment of the present disclosure. The electronic device includes one or more processors, one or more memories, one or more communication interfaces, and one or more programs. The one or more programs are stored in the memories and configured to be executed by the one or more processors.

In a possible embodiment, the electronic device is a terminal device, and the above programs include instructions for performing the following operations: receiving network configuration information sent by a network device; obtaining a CSI report based on the network configuration information, the CSI report including compressed channel information and/or an interference measurement result; and reporting the CSI report to the network device.

In another possible embodiment, the electronic device is a network device, and the above programs includes instruction for performing the following operations: transmitting network configuration information to a terminal device; and receiving a CSI report from the terminal device, the CSI report including compressed channel information and/or an interference measurement result.

All relevant contents of the various scenarios involved in the above method embodiments can be cited to the functional description of the corresponding functional module and will not be repeated here.

It should be understood that the above memory may include read-only memory and random access memory, and provide instructions and data to the processor. A portion of the memory may also include non-volatile random access memory. For example, the memory may also store information about the type of device.

In embodiments of the disclosure, the processor of the above device may be a central processing unit (CPU), which may also be other general purpose processors, digital signal processors (DSPs), application specific integrated circuits (ASICs), field programmable gate arrays (FPGAs) or other programmable logic devices, discrete gate or transistor logic devices, discrete hardware components, etc. The general purpose processor may be a microprocessor or the processor may be any conventional processor, etc.

During implementation, the operations of the method described above may be accomplished by integrated logic circuitry in the hardware in the processor or by instructions in the form of software. The operations of the method disclosed in conjunction with the embodiments of the present disclosure can be performed directly by the hardware processor, or by a combination of hardware and software units in the processor. The software unit can be located in random memory, flash memory, read-only memory, programmable read-only memory or electrically rewritable programmable memory, registers and other storage media well established in the art. The storage medium is located in the memory and the processor executes the instructions in the memory and completes the operations of the method described above in combination with its hardware. To avoid repetition, this will not be described in detail here.

Embodiments of the present disclosure further provide a chip system. The chip system includes at least one processor, a memory and an interface circuit, where the memory, the transceiver and the at least one processor are interconnected by a line. The at least one memory stores a computer program. The computer program is used by the processor to perform some or all of the operations of any of the methods as described in the method embodiments above.

Embodiments of the present disclosure further provide a computer storage medium, where the computer storage medium stores a computer program for electronic data interchange, the computer program causing the computer to perform some or all of the operations of any of the methods as described in the method embodiments above.

Embodiments of the present disclosure also provide a computer program product, where the computer program product includes a non-transitory computer-readable storage medium on which a computer program is stored, and the computer program is operable to cause a computer to perform some or all of the operations of any of the methods as described in the method embodiments described above. The computer program product may be a software installation package.

It should be noted that the preceding embodiments of the method have been presented as a series of actions for simplicity of description, but those skilled in the art should be aware that the present disclosure is not limited by the sequence of actions described, as some actions may be performed in other sequences or simultaneously according to the present disclosure. Secondly, the person skilled in the art should also be aware that the embodiments described in the specification are some embodiments and that the actions and modules involved are not necessarily necessary for the present disclosure.

In the above embodiments, the description of each embodiment has its own focus and the parts not detailed in one embodiment can be found in the relevant descriptions of other embodiments.

In the several embodiments provided in the present disclosure, it should be understood that the disclosed devices, can be implemented in other ways. For example, the embodiments of the device described above are only schematic. For example, the division of the units described above is only a logical functional division, and the units can be divided in another way in practice. For example, multiple units or components can be combined or can be integrated into another system, or some features can be ignored, or not implemented. On another point, the mutual coupling or direct coupling or communication connections shown or discussed may be indirect coupling or communication connections via some interface, device or unit, either electrically or in other forms.

The units illustrated above as separate components may or may not be physically separated and the components displayed as units may or may not be physical units, i.e., they may be located in one place or may be distributed to a plurality of network units. Some or all of these units can be selected according to practical needs to achieve the purpose of the embodiments of the disclosure solution.

Alternatively, the functional units in the various embodiments of the present disclosure may be integrated in a single processing unit, or the units may be physically present separately, or two or more units may be integrated in a single unit. The above integrated units can be implemented either in the form of hardware or in the form of software functional units.

The above integrated unit, when implemented as a software functional unit and sold or used as a stand-alone product, can be stored in a computer-readable memory. It is understood that the technical solution of the present disclosure, or that part or all or part of the technical solution which essentially contributes to the prior art, may be embodied in the form of a software product which is stored in a memory and includes a number of instructions to enable a computer device (which may be a PC, server, or TRP etc.) to perform all or part of the steps of the method of each embodiment of the present disclosure. All or some of the operations of the method of each embodiment of the present disclosure. The aforementioned memory includes various media that can store program code, such as USB sticks, read-only memory (ROM), random access memory (RAM), removable hard disks, diskettes or CD-ROMs.

It will be understood by those of ordinary skill in the art that all or some of the operations in the various methods of the above embodiments can be accomplished by instructing the relevant hardware by means of a program, which can be stored in a computer readable memory, which can include: flash drive, ROM, RAM, disk or CD-ROM, etc.

The above embodiments are only used to help understand the method and the core idea of this disclosure. At the same time, for those skilled in the art, according to the idea of this disclosure, there will be changes in the specific embodiments and the scope of disclosure. The content of this specification should not be construed as a limitation of the present disclosure.

Embodiments of the present disclosure disclose a method and apparatus for channel state information (CSI) reporting, which provide a technical solution of reporting a CSI report including compressed channel information and an interference measurement result under a scenario in which intelligent CSI feedback is supported.

In a first aspect, embodiments of the present disclosure provide a method for CSI reporting. The method is applied to a terminal device and includes: receiving network configuration information sent by a network device; obtaining a CSI report based on the network configuration information, the CSI report including compressed channel information and/or an interference measurement result; and reporting the CSI report to the network device.

In a second aspect, embodiments of the present disclosure provide a method for CSI reporting. The method is applied to a network device and includes: transmitting network configuration information to a terminal device; and receiving a CSI report from the terminal device, the CSI report including compressed channel information and/or an interference measurement result.

In a third aspect, embodiments of the present disclosure provide an apparatus for CSI reporting. The apparatus is applied to a terminal device and includes a transceiving unit configured to receive network configuration information sent by a network device; and a processing unit configured to obtain a CSI report based on the network configuration information, the CSI report including compressed channel information and/or an interference measurement result, where the transceiving unit is further configured to report the CSI report to the network device.

In a fourth aspect, embodiments of the present disclosure provide an apparatus for CSI reporting. The apparatus is applied to a network device and includes a transceiving unit configured to transmit network configuration information to a terminal device, and the transceiving unit is further configured to receive a CSI report from the terminal device, where the CSI report including compressed channel information and/or an interference measurement result.

In a fifth aspect, an electronic device is provided. The electronic device includes a processor, a memory, a communication interface, and one or more programs, where the one or more programs are stored in the memory and configured to be executed by the processor, the programs include instructions for performing the method of the first or second aspect.

In a sixth aspect, a computer-readable storage medium is provided, which stores a computer program for electronic data interchange, where the computer program causes a computer to perform the method of the first or second aspect.

In a seventh aspect, a computer program product is provided. The computer program product includes a non-transitory computer-readable storage medium storing a computer program. The computer program is operable to cause a computer to execute part or all of the method of the first or second aspect. The computer program product may be a software installation package.

In an eighth aspect, a chip system is provided. The chip system includes at least one processor, a memory and an interface circuit, where the memory, the transceiver, and the at least one processor are connected through wires, the at least one memory stores a computer program which, when executed by the processor, implements the method of the first or second aspect.

According to the technical solution provided in the disclosure, the terminal device receives the network configuration information from the network device, and obtain the CSI report based on the network configuration information, where the CSI report includes the compressed channel information and/or the interference measurement result. Then the terminal device report the CSI report. In this way, under a scenario in which intelligent CSI feedback is supported, the terminal device can report to the network device the compressed channel information and the interference measurement result obtained according to the network configuration information, such that the technical solution of CSI reporting under the intelligent CSI feedback scenario is achieved.

What is claimed is:

1. A method for channel state information (CSI) reporting, applied to a terminal device and comprising:

receiving network configuration information sent by a network device;

obtaining a CSI report based on the network configuration information, the CSI report comprising compressed channel information and/or an interference measurement result, wherein the CSI report comprises input length information of a compression module; and reporting the CSI report to the network device.

2. The method of claim 1, wherein the CSI report consists of part 1 and part 2.

3. The method of claim 2, wherein the part 1 comprises the compressed channel information; and the part 2 comprises group 0 and/or group 1, the group 0 comprising a channel state information-interference measurement (CSI-IM)-based interference measurement result, the group 1 comprising a non-zero power (NZP) channel state information-reference signal (CSI-RS)-based interference measurement result.

4. The method of claim 3, wherein the part 1 further comprises the input length information and/or output length information of the compression module.

5. The method of claim 3, further comprising:

prior to reporting the CSI report to the network device, dropping preferentially some or all of the part 2 with a lower or higher priority in a priority order if uplink feedback resources are limited.

6. The method of claim 5, wherein the priority order is group 0>group 1.

7. The method of claim 2, wherein the part 1 comprises the input length information and/or output length information of the compression module; and the part 2 comprises the compressed channel information and/or the interference measurement result.

8. The method of claim 2, wherein the part 1 comprises the input length information and/or output length information of the compression module, and/or the interference measurement result; and the part 2 comprises the compressed channel information.

9. The method of claim 1, wherein the network configuration information is CSI report configuration information, the CSI report configuration information comprises explicit or implicit indication information, and the indication information is used for indicating a type of a CSI measurement result expected to be contained in an associated CSI report.

10. The method of claim 9, wherein the type of the CSI measurement result comprises type I and type II, wherein the type I is a type that has been supported by an existing standard, and the type II is a type supporting channel information compression.

11. The method of claim 10, wherein the CSI report consists of part 1 and part 2, and the method further comprising:

prior to reporting the CSI report to the network device, dropping preferentially some or all of the CSI report with a lower or higher priority in a priority order if uplink feedback resources are limited, wherein the second priority order is: part 1 of the CSI report with the CSI measurement result of type II≥part 1 of the CSI report with the CSI measurement result of type I≥part 2 of the CSI report with the CSI measurement result of type II≥part 2 of the CSI report with the CSI measurement result of type I.

12. The method of claim 9, wherein the CSI report configuration information further comprises quantity information of receiving antennas of the terminal device.

13. The method of claim 12, further comprising:

determining, by the terminal device, the input length information and/or output length information of the compression module according to the quantity information of receiving antennas.

14. The method of claim 9, wherein the CSI report configuration information further comprises the input length information and/or output length information of the compression module.

15. The method of claim 14, wherein the input length information and/or the output length information of the compression module are determined according to capability information reported by the terminal device.

16. An electronic device, comprising a processor, a memory, a communication interface, and one or more programs, wherein the one or more programs are stored in the memory and configured to be executed by the processor to cause the electronic device to:

receive network configuration information sent by a network device;

obtain a channel state information (CSI) report based on the network configuration information, the CSI report comprising compressed channel information and/or an interference measurement result, wherein the CSI report comprises input length information of a compression module; and report the CSI report to the network device.

17. The electronic device of claim 16, wherein the CSI report consists of part 1 and part 2.

18. The electronic device of claim 17, wherein the part 1 comprises the compressed channel information; and the part 2 comprises group 0 and/or group 1, the group 0 comprising a channel state information-interference measurement (CSI-IM)-based interference measurement result, the group 1 comprising a non-zero power (NZP) channel state information-reference signal (CSI-RS)-based interference measurement result.

19. The electronic device of claim 18, wherein the part 1 further comprises the input length information and/or output length information of the compression module.

20. A non-transitory computer-readable storage medium storing a computer program which, when executed by a terminal, causes the terminal to:

receive network configuration information sent by a network device;

obtain a channel state information (CSI) report based on the network configuration information, the CSI report comprising compressed channel information and/or an interference measurement result, wherein the CSI report comprises input length information of a compression module; and report the CSI report to the network device.

* * * * *